Figure 4:
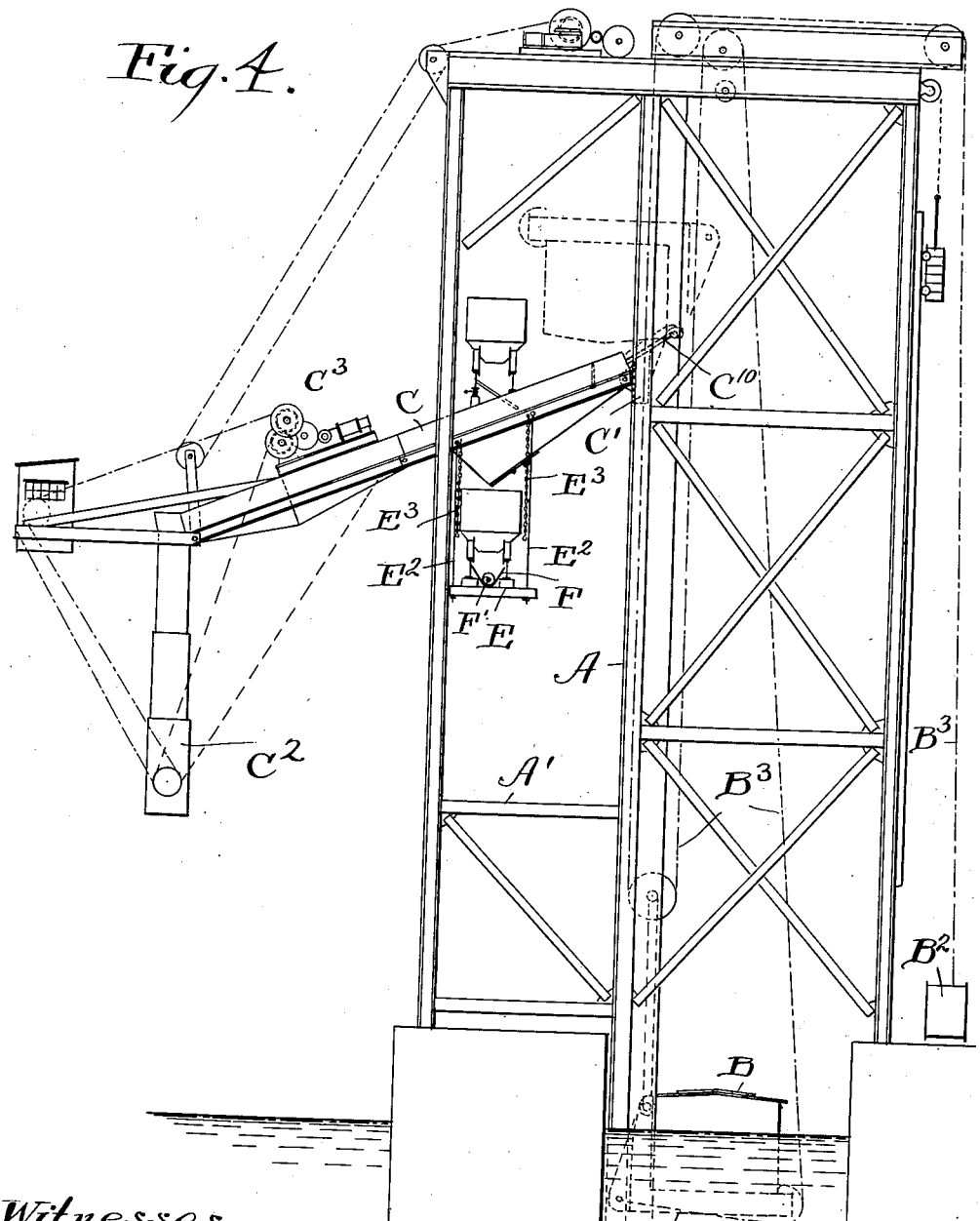

F. W. LOVELL.
APPARATUS FOR LOADING AND UNLOADING COAL AND SIMILAR MATERIAL.
APPLICATION FILED OCT. 9, 1908.
1,033,602.
Patented July 23, 1912.
5 SHEETS—SHEET 1.
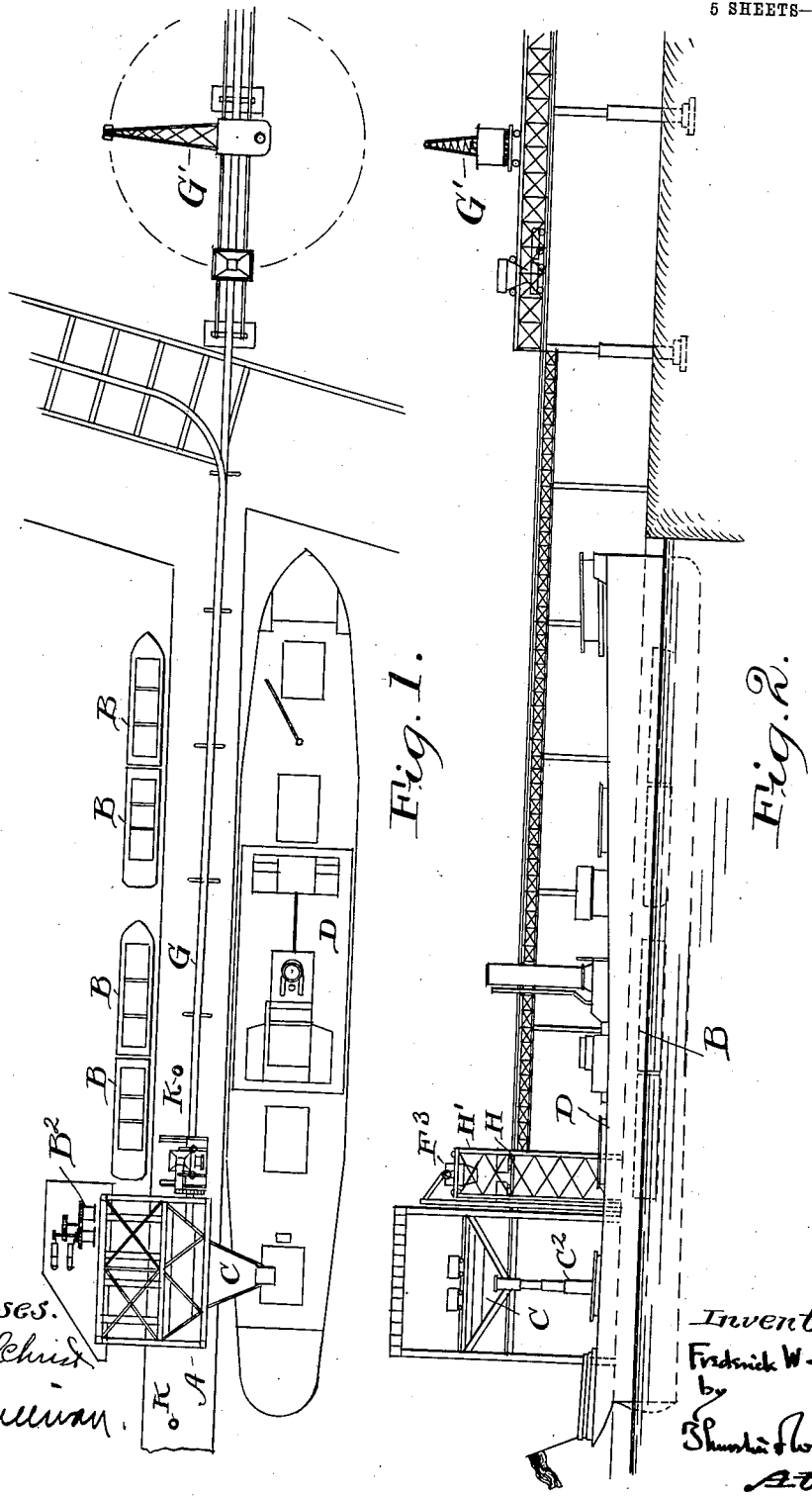

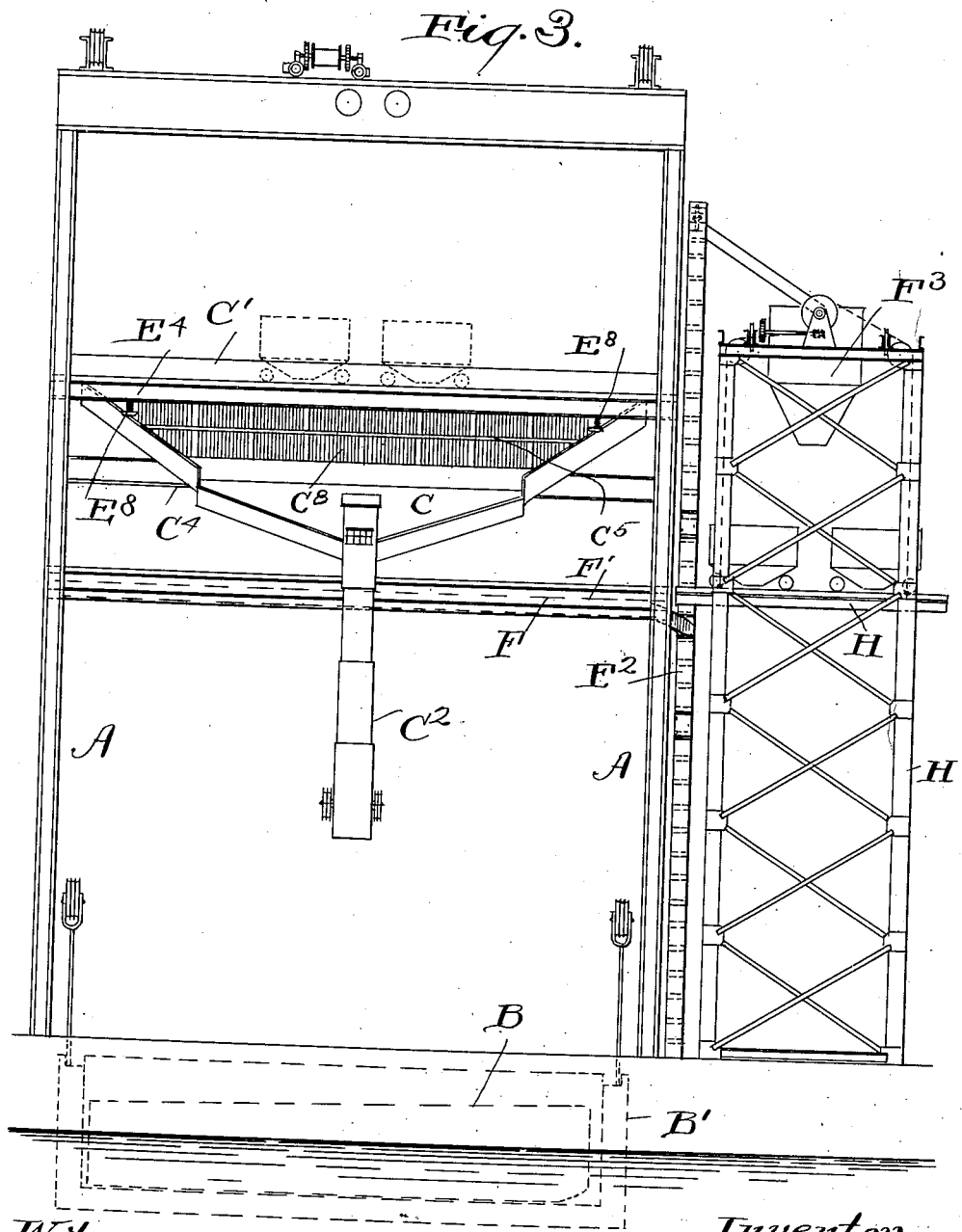

F. W. LOVELL.
APPARATUS FOR LOADING AND UNLOADING COAL AND SIMILAR MATERIAL.
APPLICATION FILED OCT. 9, 1908.

1,033,602.

Patented July 23, 1912.

5 SHEETS—SHEET 3.

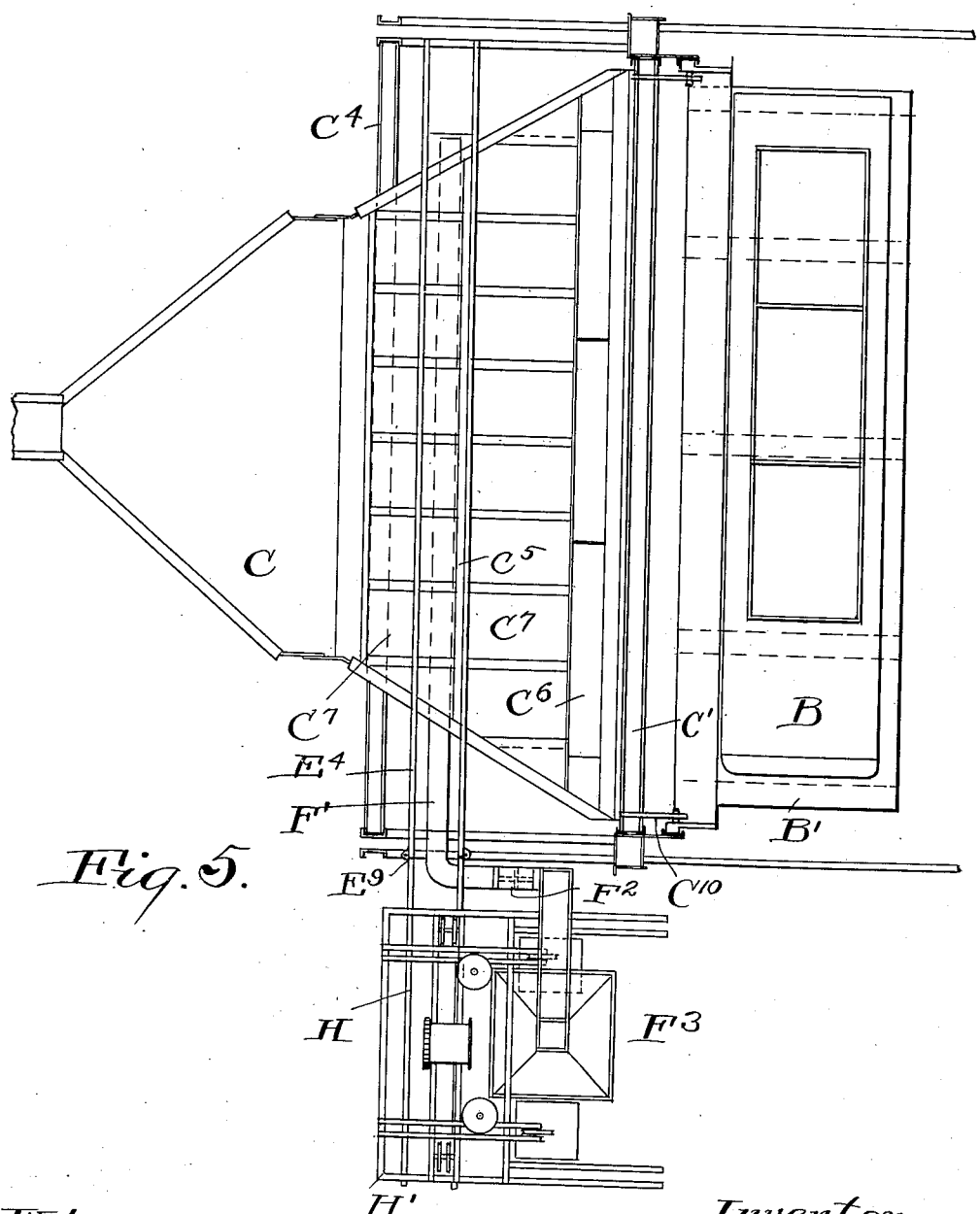

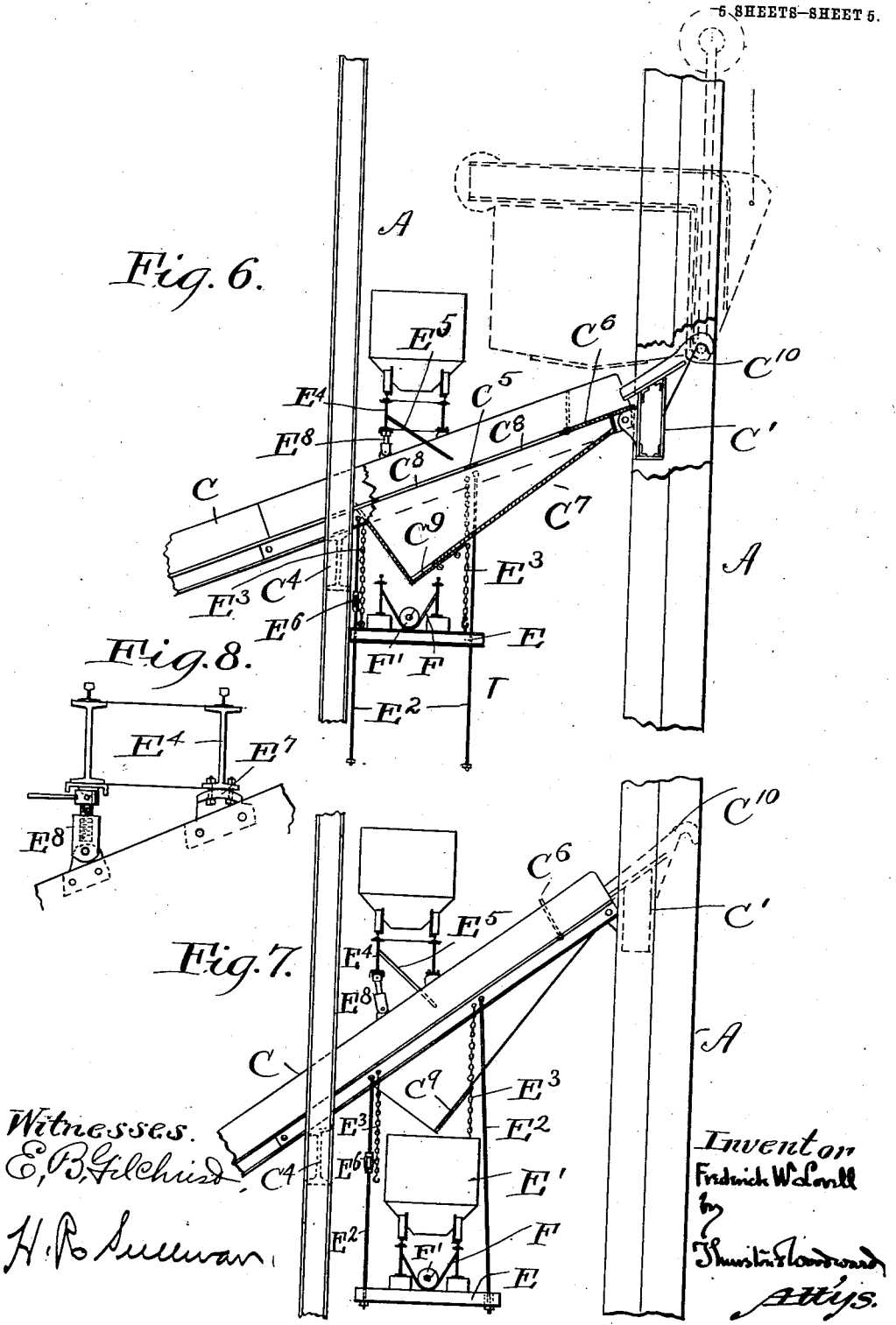

UNITED STATES PATENT OFFICE.

FREDERICK W. LOVELL, OF CLEVELAND, OHIO, ASSIGNOR TO THE McMYLER MANUFACTURING COMPANY, A CORPORATION OF OHIO.

APPARATUS FOR LOADING AND UNLOADING COAL AND SIMILAR MATERIAL.

1,033,602.   Specification of Letters Patent.   Patented July 23, 1912.

Application filed October 9, 1908. Serial No. 456,857.

*To all whom it may concern:*

Be it known that I, FREDERICK W. LOVELL, a citizen of the United States, residing at Cleveland, in the county of Cuyahoga and State of Ohio, have invented a certain new and useful Improvement in Apparatus for Loading and Unloading Coal and Similiar Material, of which the following is a full, clear, and exact description.

The present invention is directed to loading and unloading apparatus designed to handle coal, ore and similar material in bulk as in canal boats or carload lots.

The object of the invention has been to provide arrangements and mechanisms whereby it will be possible to dispose of material in practically any manner desired by the operator, since it is some times preferable to dispose of the material either in whole or in part in a manner different from that followed at other times.

It has more particularly been my object to arrange the apparatus so that the material, which I shall hereafter refer to as coal merely for convenience, may be taken from the primary receptacle such as a canal boat or car and dumped either directly in the proper manner to a large carrier such as an ocean steamer or diverted to a storage pile from which it may be brought subsequently to be dumped by the same apparatus into the large carrier referred to.

It has been a further object to handle the coal in this manner by a unitary apparatus, being properly screened or not according to the particular operation being carried out.

It has been a further object to provide means whereby the parts of the apparatus may perform all of their normal functions and yet admit of the adjustment of the dumped apron to take care of different qualities of coal, some of which require a greater or less inclination of the apron for the best handling thereof.

It has been a further object to provide a suitable and convenient means for the handling of the screenings which may be used equally well without interference with the rest of the apparatus whether the coal be taken immediately from the primary receptacle or from the storage pile.

The above objects and many other desirable advantages it will be seen are obtained by that embodiment of my invention illustrated in the accompanying drawings, in which;

Figure 1 is a plan view of an arrangement of my apparatus for use in discharging coal from canal boats to steamers or to a storage pile, as may be desired, and from the storage pile to the steamer. Fig. 2 is an elevation of the apparatus as arranged in Fig. 1. Fig. 3 is a front elevation of the tower on which the loading and unloading apparatus is located together with an elevator adjacent thereto for the proper handling of the carriers which take care of the screenings and serve to convey the coal to and from the storage pile. Fig. 4 is an end elevation of the tower shown in Fig. 3, the elevator not being shown. Fig. 5 is a plan view of the apparatus shown in Fig. 3. Fig. 6 is an enlarged detail of the upper end of the dumping apron, partly in section, the special conveyer for the screenings being shown in operating position and the position of the boat cradle being indicated in dotted lines. Fig. 7 is an elevation of the same parts shown in Fig. 6, but with the apron dropped to a greater inclination for the purpose of handling material such as slack coal and with the special conveyer for the screenings dropped to admit the use of the car for conveying the coal to the storage pile. Fig. 8 is a further enlarged detail of the trackway mounted above the apron showing a means of adjusting the track level for the purpose of accommodating it to the different inclinations of the apron.

Considering the use of the apparatus here shown for the handling of canal boats, I prefer to erect the tower A adjacent to the travelway of the boats B and equip it with a dumping cradle B', the detailed construction of which is not material to the present case, but which in general form and method of operation is similar to the well-known McMyler cradle for dumping cars with the omission of those parts, such as the sliding table, which are of peculiar advantage to cars and serve no purpose in connection with canal boats. When, however, I use this apparatus for the handling of cars instead of canal boats, it will be understood that I propose to use such accessories as may be regarded as advantageous in connection with cars. A suitable hoisting drum $B^2$ and cable connection $B^3$ (see Fig. 4) is employed for raising the cradle to such point as may be necessary for tilting it over the inner end of an apron C carried on the forward part of the tower.

The said apron is pivotally mounted on a girder C' (see Fig. 6) vertically movable in ways on the tower frame for the purpose of giving it the proper elevation, which may vary according to the carrier into which the coal is to be placed. The apron has at its outer forward end a telescopic chute $C^2$ with operating apparatus $C^3$ therefor of the conventional sort for guiding the coal to a large carrier, such as the steamer D. The apron has a second point of support intermediate its length at the forward face of the frame, this support being preferably in the form of a transversely extending girder $C^4$ on the upper edge of which the bottom of the apron rests so as to have a free sliding movement thereover whenever said girder is raised or lowered for the purpose of varying the inclination of the apron. It will thus be seen that by reason of the vertical adjustability and independence of movement of the two points of support of this apron, any desired effect for any sort of material or any height of receiving carrier may be easily had.

The upper or inner end of the apron has a double bottom, the upper bottom $C^5$ having a vertically swinging door $C^6$ at the inner end covering an opening which permits the coal to pass to the lower bottom $C^7$ without proceeding down the apron farther. The upper bottom of the apron below this swinging door or gate has screens $C^8$ by which the coal may be separated from the screenings as it is charged into the steamer, the screenings dropping on to the lower floor of the apron.

It will be observed, of course, that when the swinging gate $C^6$ above referred to is closed, all of the coal dumped from the canal boat, except the screenings, will pass directly down the apron to the chute at the outer end thereof. When said gate is open it will serve as a dam against the passage of any coal whatever over the screens, after it is dumped from the boat, and all of the coal in this case will pass down through the gate opening on to the lower or second bottom of the apron. This second bottom extends but a comparatively short distance, forming a closed chamber beneath the upper bottom, and is provided with a sliding gate $C^9$ by which the outflow of the material therein may be controlled. From the structure above described it will be seen that the material taken out through the gate of the second bottom will, in some cases, be the whole coal as it is dumped from the canal boat, and will, in other cases, comprise only screenings.

Beneath the apron and suspended therefrom I provide means both for taking care of the whole coal and the screenings when occasion may require. The means which I have here shown for taking care of the whole coal, which is only diverted in this manner when it is desired to pass it to the storage pile instead of directly to the steamer, comprises a trackway E extending from beneath the gate $C^9$, in the lower floor of the apron, to one end of the tower so that cars E' or similar conveyers may be run in under the gate for the purpose of receiving the coal discharged therefrom. This trackway I prefer to suspend by means of a pair of swinging rods $E^2$, one of which is provided with a turnbuckle or similar adjusting means for purposes to appear below. The cars on this trackway are thus in use when the gate in the floor of the upper end of the apron is opened and turned up for the purpose of diverting the whole coal dumped therein to the storage pile rather than to the steamer instead of permitting it to pass down the chute to the steamer. In the middle of this trackway I have shown a trough F provided with a screw conveyer F', which trough and conveyer lead to one end of the tower for the purpose of discharging the screenings into a vertical endless conveyer $F^2$ subsequently referred to.

As will be apparent, the trackway E itself and the cars thereon will not be needed at such times as the conveyer F' for the screenings is in use, since these cars receive the whole coal for the storage pile, whereas the said conveyer F' is of use only when the whole coal minus the screenings is being passed down the apron to the steamer. Therefore I am enabled to bring the screenings conveyer up in close proximity to the discharge gate of the floor of the apron without interfering with any of the functions of the apparatus. For accomplishing this I lower the apron, there being no cars upon the said trackway, until the ends of the trackway E rest upon some such obstruction as cross beams A' in the end of the frame. The apron is then lowered still farther, the swinging rods $E^2$ by which the trackway is supported permitting this, since they pass through openings in the trackway and have heads at the lower end thereof for supporting the latter. When the lower floor of the apron is in close proximity to the screenings trough, the trackway is then attached to the apron by a second set of supports such as the chains $E^3$ and hooks shown in Figs. 6 and 7. The apron may be then raised to the proper height for use. The coal then dumped therein and run over the screens will be separated from the screenings which pass to the lower floor and out of the discharge gate into the trough F On the apron and over the screens is a second trackway $E^4$ constructed in a suitable manner, as for example, by I beams having cross braces between the same. This trackway is for the purpose of receiving carriers or cars or other suitable conveyers bringing whole coal from the storage pile to be dropped on the apron and discharged into the steamer below. A deflecting shield $E^5$ is provided below the trackway for the purpose of directing the coal over the screen portion of the apron floor. It frequently happens, as above indicated, that it is necessary to lower the outer end of the apron to a comparatively great extent for securing an increased inclination in handling slow moving materials. When this is done it will be plain that the two trackways would, unless some suitable means was provided against the occurrence, be correspondingly inclined sidewise. In order to prevent this in the case of the lower trackway, I provide a turnbuckle $E^6$ in one of the swinging rods so that proper compensation may be had as shown in Fig. 7. The upper trackway may be mounted by some such means as shown in Fig. 8 in which the inner edge of the girder forming the trackway has a swinging movement about its support $E^7$, while the outer edge is supported by adjustable jacks $E^8$ pivotally mounted. Other suitable means may obviously be provided, but the means which I have here shown are satisfactory.

In the present arrangement I have shown but one road bed G for the travel of the cars in both directions between the apron and the storage pile. It is not necessary to use both the upper and the lower trackways carried by the apron at the same time, since the use of one only occurs when the other is out of use. It might therefore be possible to have the trackway from the storage pile approach the tower at a certain height and accommodate the elevation of the apron to this height so that the cars could be moved on to either the upper or the lower tracks carried by it according to the use to which the apparatus might be put at the time. In practice, however, it is not desirable to do this, since the heights of the steamers being loaded vary considerably, and for other reasons known to those familiar with the subject. I therefore propose to interpose between the road leading from the storage pile and the trackways carried by the apron, an elevator H designed to receive a suitable number of cars and raise or lower them to the proper level for passing on in their travel. The ends of the trackways $E$, $E^4$ carried by the apron should be hinged as at $E^9$, Fig. 5, to permit of lateral movement for the purpose of swinging them into exact vertical alinement with the trackway on the elevator. I have also provided on the elevator frame $H'$ a hopper $F^3$ for receiving and holding the screenings caught beneath the dumping apron. The vertical endless conveyer $F^2$ conducts the screenings from the end of the trough F as they are discharged therefrom, up to the proper height for discharge into the said hopper. From this hopper they may be discharged into the cars on the elevator beneath and carried away.

The road bed G, elevated or otherwise, according to the topography of the adjacent territory, approaches said elevator at a suitable height for the use of the cars running between the apron and the storage pile. There is but one track shown on this road bed. Of course additional tracks, switches and sidings may be provided as needed. A loading crane $G'$ or equivalent device is located at this storage pile so that the cars may be both unloaded and loaded at this point according to the uses of the apparatus.

In operation the primary carrier by which the coal is brought to the unloading tower is properly positioned on the cradle. In the case of canal boats it is preferred that this be done by means of winches K installed on the wharf. After the boat has been properly secured on a cradle by any suitable method such, for example, as that employed by car dumpers, the hoisting engine is put into operation and the cradle carried upward until it strikes a projection $C^{10}$ on the end of the apron girder $C'$. The cradle is then tilted, as will be obvious, and the boat turned so as to dump its contents into the upper part of the apron. If the coal is to go directly to the steamer, the gate at the upper end of the apron floor is closed so that the coal will not pass through to the second or lower floor of the apron. As the coal passes down the apron it will be screened and the screenings will drop on to the second or lower floor while the screened coal passes to the discharge chute and is delivered to the vessel below.

The inclination of the apron and the proper relative height of the same is determined by the position of the girder $C'$ at its upper end and the girder $C^4$ on which it is slidingly supported in the intermediate portion of its length. During such an operation as this there will of course be no use for the lower trackway unless it be decided to convey the screenings away in cars instead of by some such carrier as that which I have shown, and further there will be no use for the upper trackway unless at the same time coal is being brought from the storage pile for loading into the same vessel as that into which the coal from the canal boat is being loaded. The lower trackway will therefore, under such circumstances, be held up close to the discharge outlet in the second or lower floor of the apron so that the screenings may be caught and conveyed away in the trough provided therefor. These screenings are discharged by the screw conveyer shown into the endless carrier placed adjacent to the end of the tower, which carrier will deliver them, as above stated, to the hopper F² on the elevator frame H' or to any other desired point. The trackway of the elevator may at such times be raised and lowered for the purpose of raising empty cars between the level of the road bed and the bottom of the hopper at the upper end of the elevator tower, the cars full of screenings being run off on the road bed to any desired dumping point.

It may be here noted that the hopper on the elevator frame is sufficiently elevated to give the proper headroom for the elevator and the cars at the highest level to which the trackways of the apron will be raised during use. Should, of course, it be desired to not use the screw conveyer which I have shown for the screenings, it will be possible to run cars for conveying away the screenings on to the lower trackway of the apron directly beneath the discharge gate of the lower floor. There are some advantages about each method of operation and I wish it to be clearly understood that either may be employed.

Under some circumstances, as for example, when no steamer is present to receive the load of the canal boats or when the canal boats on hand have different grades of coal which it is not desired to mix, it may be preferred to have the coal dumped from some of the canal boats carried to the storage pile temporarily, and under these circumstances I raise the gate C⁶ in the upper floor of the apron so that the coal dumped from the boat will pass through to the second floor, from which it is delivered through the gate C⁹. The whole coal delivered through the bottom apron in this manner is conducted away by cars across the elevator, to the road bed, to the storage pile. When it is desired to bring the coal back from the storage pile and load it into the steamers, the cars carrying it are run on to the upper trackway of the apron and emptied so that the coal is discharged on to the apron and run over screens, the screenings dropping on to the lower floor of the apron, while the screened coal passes down the chute to the vessel just as is the case with the coal discharged from the canal boat. The screenings, of course, are taken care of in this case in the same manner as in the case of screenings from the canal boat, and the cars are run back and forth over the upper trackway on to the elevator and over the road bed to the storage pile to the extent necessary.

In any of the operations requiring the use of the trackways carried by the apron it will of course be seen to that the trackways are adjusted by the means above described to the proper level. It will also be arranged whenever the inclination of the apron is such as to throw these trackways out of vertical alinement with the trackway on the elevator, that the swinging ends of the said trackways are shifted so as to effect proper registration of the rails.

With the arrangement of apparatus above described it will be seen that I have attained the objects of invention sought and have done this in a manner permitting of a wide range of choice as to the manner of operation in meeting the conditions obtaining in the loading and unloading of coal. I do not desire to be considered in this application as claiming those general arrangements of parts the existence of which must be obvious to any experienced engineer when the problem is first presented to him, nor do I desire to either broadly claim the general idea of using the well-known car dumper cradle for canal boats, since these cradles, with modifications, may obviously be used for both cars and canal boats. I merely desire to be considered as claiming the mechanisms and parts which in themselves are new either as to structure or method of operation or as to their general arrangement with regard to each other.

Having thus described my invention, I claim:

1. A hoisting tower having dumping apparatus thereon, a vertically movable apron, screens in said apron floor, a second floor beneath the screens, a discharge outlet for said second floor, a screenings conveyer beneath said outlet and means for raising and lowering said conveyer to bring it in close proximity to the outlet or remove it therefrom.

2. Apparatus of the character described comprising a tower having dumping apparatus and an apron thereon, trackways carried above and below said apron, an elevator adjacent to said tower, a road bed adjacent to said elevator, said elevator carrying a trackway adapted to be alined with said road bed and with the tracks above and below the apron.

3. In apparatus for dumping cars or canal boats, an apron for receiving the load said apron being provided with an opening, means for lifting and overturning a car or canal boat to dump its load upon said apron near its upper end, a swinging door adapted to close said opening when in one position and to form a barrier across the apron when in another position, and a floor support below the opening in the apron floor.

In testimony whereof, I hereunto affix my signature in the presence of two witnesses.

FREDERICK W. LOVELL.

Witnesses:
H. R. SULLIVAN,
J. M. WOODWARD.